United States Patent [19]

Mengeringhausen et al.

[11] 4,162,860
[45] Jul. 31, 1979

[54] FLANGE-SCREW CONNECTION FOR RODS IN THREE-DIMENSIONAL FRAMEWORKS

[75] Inventors: Max Mengeringhausen; Reinhard Schmidek, both of Würzburg, Fed. Rep. of Germany

[73] Assignee: MERO-Raumstruktur GmbH & Co., Würzburg, Fed. Rep. of Germany

[21] Appl. No.: 936,343

[22] Filed: Aug. 24, 1978

[30] Foreign Application Priority Data

Sep. 27, 1977 [DE] Fed. Rep. of Germany ....... 2743269

[51] Int. Cl.² .......................... F16B 9/02; F16L 41/00
[52] U.S. Cl. .................................... 403/199; 403/262; 403/337; 52/81
[58] Field of Search .............. 403/260, 262, 217, 218, 403/337, 189, 199, 298, 359, 406, 408; 64/17 A, 4; 52/81

[56] References Cited

U.S. PATENT DOCUMENTS

| 768,201 | 8/1904 | Suppes | 403/298 |
| 819,909 | 5/1906 | Müller | 403/298 |
| 1,552,569 | 9/1925 | Schurman | 403/262 X |
| 3,869,878 | 5/1975 | Davies et al. | 64/4 X |
| 4,054,392 | 10/1977 | Oppenheim | 403/189 X |

FOREIGN PATENT DOCUMENTS

| Ad.57598 | of 1953 | France | 403/264 |
| 705009 | 3/1954 | United Kingdom | 64/17 A |

*Primary Examiner*—Wayne L. Shedd
*Attorney, Agent, or Firm*—Jacobi, Lilling & Siegel

[57] ABSTRACT

A flange-screw connection between a rod and a junction means having corresponding support surfaces, characterized in that a flange is secured to a connecting part provided at the end of the rod, the connecting part being of such cross section as to have the same (area) moment of inertia as the rod. The flange comprises bores adapted to receive fastening screws therethrough, the bores being disposed near the outer periphery of the flange and each terminating in an insertion cavity for receiving the fastening screws.

7 Claims, 8 Drawing Figures

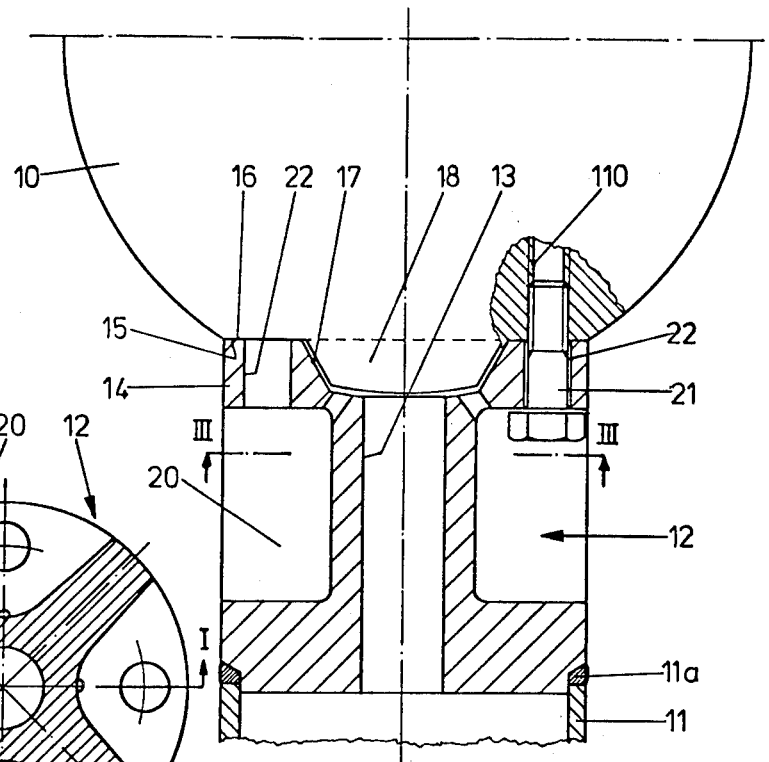
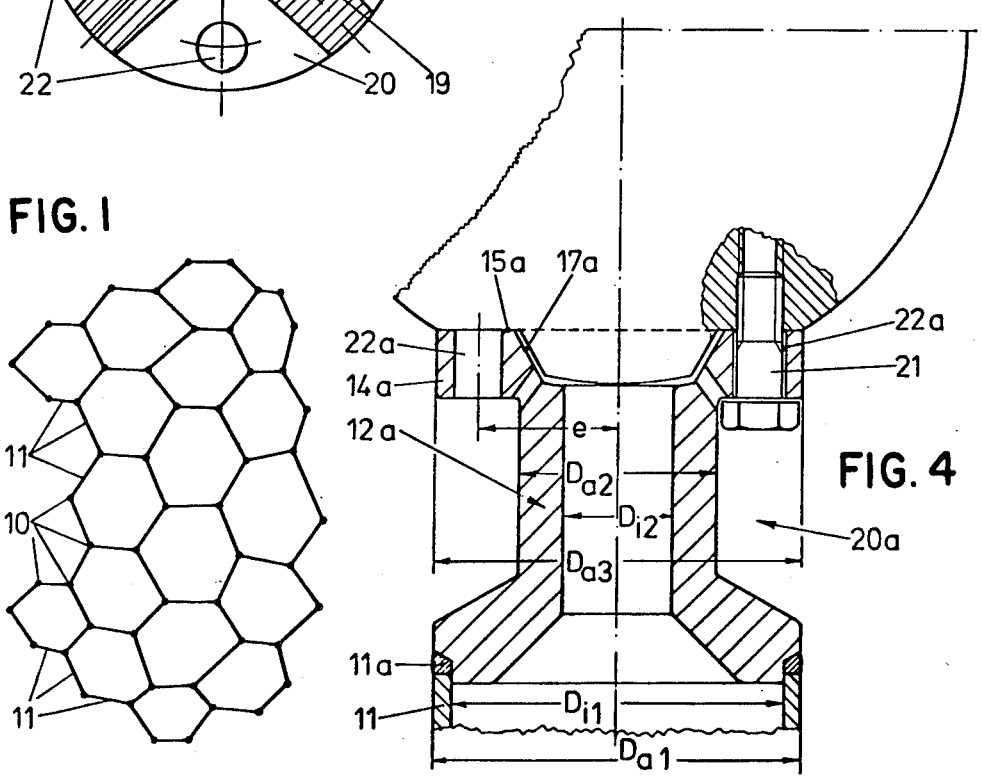

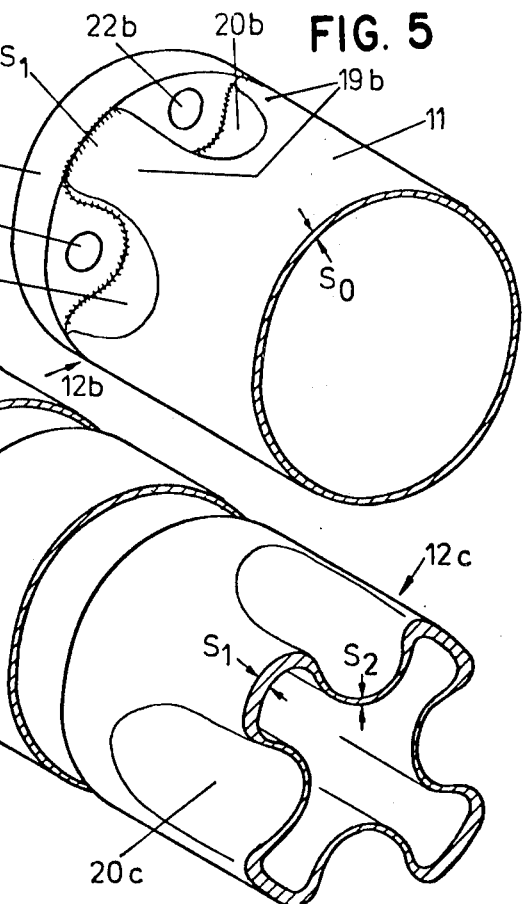
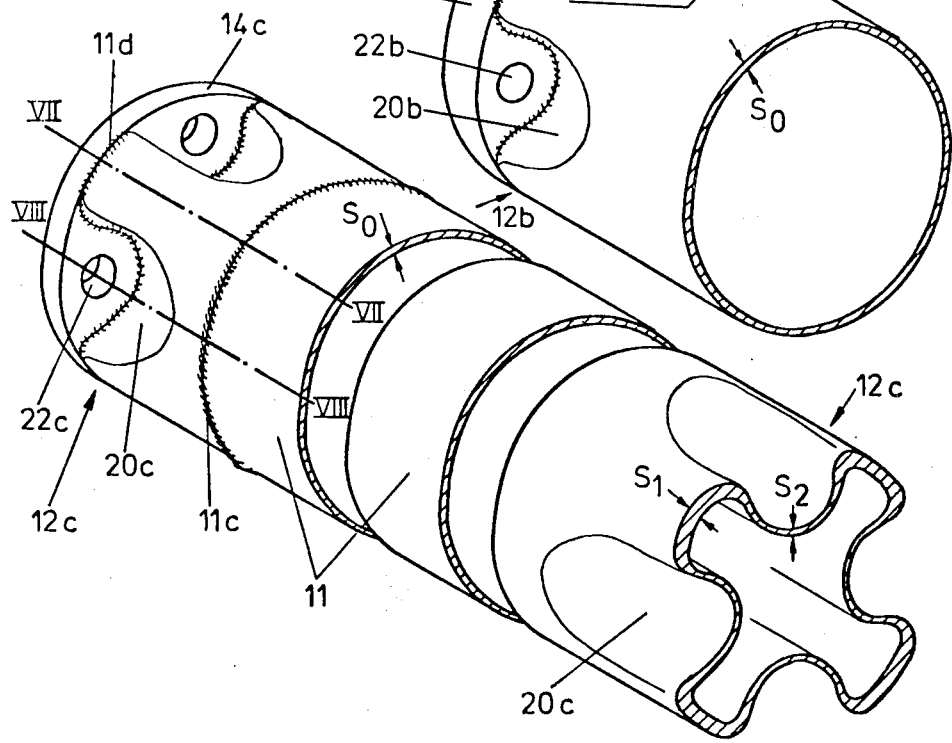
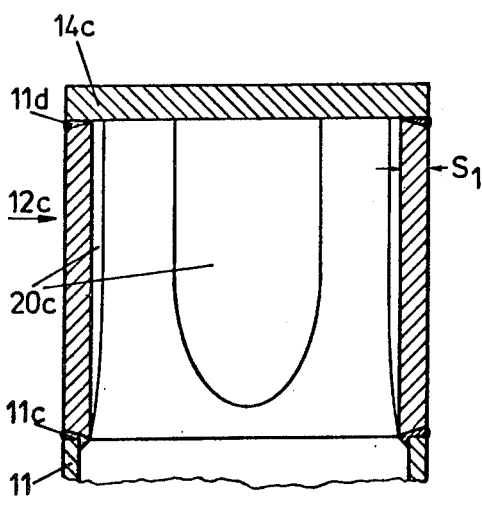
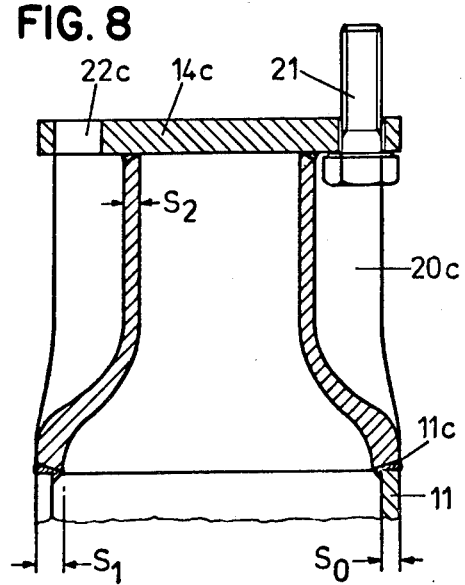

FLANGE-SCREW CONNECTION FOR RODS IN THREE-DIMENSIONAL FRAMEWORKS

BACKGROUND OF THE INVENTION

The present invention relates to a flange-screw or bolt connection between preferably tubular rods on one hand and junction means equipped with corresponding support surfaces on the other, as used in three-dimensional frameworks.

German Offenlegungschrift No. 2,423,464 discloses how to fasten the tubular rod ends by means of a flange and numerous screws to a spherical junction of which the support surfaces are designed as individual bosses. This design, however, renders the junction relatively bulky and costly. Also, in this known design, the tubular rod ends in conformity with the previous usage taper off conically such that flange-screw connections can absorb only relatively low bending forces, whereby they are unsuitable, for instance, for single-shell three-dimensional frameworks or cupolas. In such instances, very substantial bending moments and torsion may arise in addition to the ordinary compression and tension forces, and such moments and torsion must be absorbed by the flange-screw connections between the tubular rods and junction means.

SUMMARY OF THE INVENTION

The present invention addresses the problem of creating a flange-screw connection between rods and junction means in three-dimensional frameworks which, in addition to high tension and compression forces, also can absorb high bending and torsional forces. This problem may arise, for instance, in single-shell three-dimensional frameworks for domes, when—as shown in FIG. 1—the polygons of the dome framework consists of hexagons lacking shape stability.

This invention solves this problem for a flange-screw connection of the initially described kind by mounting the flange on a connecting means provided at the ends of the rods, the connecting means being of such cross-section as to provide the same cross-sectional moment of inertia or stiffness as the rod, and by the bores in the flange seating the fastening screws, being located at its outer periphery and terminating in one or more chambers designed as insertion cavities for these fastening screws. Such a flange-screw connection can be achieved using smaller junction means than are conventional in the state of the art, and hence is more economical and can transmit, in addition to the ordinary compression and tension forces, extremely high bending and torsion moments from a tubular rod to a junction and vice versa. There is furthermore the possibility of so pre-clamping the fastening screws using conventional tools that not only are the above-cited bending and torsional moments reliably absorbed, but also a bending-resistant connection is achieved.

The bores in the flange seating the fastening screws being located tightly against the outer flange periphery, the spacing between the rod axis and the screw axes is kept optimally large and as such affects like a lever the bending moment at the screw connection. Because the flange bores terminate in insertion cavities for the fastening screws, these can be easily introduced in the cavities from the side, slipped through the bores, turned into the threads of the junction, and tightened. Introduction of a tubular rod between two junctions already fixed in place is facilitated by eliminating axially protruding fastening means.

Appropriately the connecting means is provided with lengthwise ribs between which extend the insertion cavities of the fastening screws.

The lengthwise or longitudinal ribs of the connecting means also comprise those which are only approximately parallel to the rod axis.

If, according to another implementation of the invention, the outer diameter of the connecting means including the flange corresponds to that of the rod, then it is possible to keep the support surfaces at the junctions correspondingly small, whereby again relatively small, economical junction means can be used, especially for single-shell, three-dimensional frameworks.

The invention furthermore allows the shaping of the connecting means into a flange at the ends of the rods and the welding thereof to the flange proper. The deformation of the rod ends into the connecting means may be carried out, for instance, using conventional forging.

In another embodiment of the invention, the connecting means can be welded as a separate part to the rod ends.

Reduction in costs is achieved by providing the flange with an annular connecting surface and the junction with a correspondingly fitted annular support surface to seat that of the flange.

Assembly is facilitated if, according to a further feature of the invention, a recess is provided inside the annular connecting surface of the flange which is adapted to receive a centering projecting means of the junction.

BRIEF DESCRIPTION OF THE DRAWINGS

The invention is discussed in greater detail hereinafter in relation to the embodiments shown in the drawings wherein:

FIG. 1 is a schematic view of a single-shell, three-dimensional framework dome allowing application of the flange-screw connection of the invention;

FIG. 2 is a side elevational view in section of the flange-screw connection of the invention, showing part of a tubular rod and junction;

FIG. 3 is a sectional view of the connecting component taken along line III—III of FIG. 1;

FIG. 4 is a view similar to FIG. 2, showing a modified connecting component;

FIG. 5 is a perspective view of the end of a tubular rod with a unitary shaped connecting component and flange welded to it;

FIG. 6 is a perspective view of the end of a tubular rod with a modified welded connecting component and welded flange;

FIG. 7 is a partial lengthwise sectional view of the connecting component of FIG. 6 taken along line VII—VII of FIG. 6; and FIG. 8 is a partial lengthwise sectional view of the connecting component of FIG. 6 taken along line VIII—VIII of FIG. 6.

DESCRIPTION OF THE PREFERRED EMBODIMENTS

For that part of a single-shell three-dimensional framework shown in FIG. 1, three tubular rods 11 are connected at different angles to each junction 10, the individual flange-screw connections between tubular rods and junctions being loaded by tension and compression forces as well as by bending and torsional moments. For a three-dimensional dome framework of which the largest diameter is about 60 m. and for which tubular rods with an outside diameter, for instance, of 159 mm. and a wall thickness of, for instance, 8 mm. are used, bending moments up to 1.5 Mpm and torsional moments up to 0.75 Mpm as well as additional tension and compression forces of several Mp may arise.

FIG. 2 shows part of a spherical junction 10 comprising four threaded bores 110 at every rod connection site. FIG. 2 further shows the end of a tubular rod 11 of circular cross-section to which is fastened, by means of an annular weld 11a, to a connecting part 12 with an outside diameter corresponding to that of the tubular rod 11. A similar connecting part is welded to the opposite end of the tubular rod 11 (not shown). Connecting part 12 is provided with a continuous longitudinal bore 13 in order to provide the inner periphery of the tubular rods, which are made of steel for instance, with a corrosion resistant coating. Connecting part 12 may be a forged piece comprising an integrally shaped flange 14 with an annular connecting surface 15. This annular connecting surface 15 is seated on a correspondingly fitted support surface 16 at junction 10 when the tubular rod is assembled. It is noted that one such annular support surface is provided at every rod connecting point of the junction 10.

Flange 14 is provided with a generally conical recess 17 inside the annular connecting surface 15 for cooperation with a centering boss 18, shaped as a frustrum of a cone, of junction 10, to facilitate precise assembly of a tubular rod to the junction.

Connecting part 12 is provided at its middle section with insertion cavities 20 separated in cross-like manner by four lengthwise ribs 19 (see FIG. 3) used for the fastening screws or bolts 21 which are equal to or less in length than the cavities 20. When a tubular rod 11 is being assembled, its lower connecting part 12 first is held by a boss 18 against the particular junction 10 whereupon the fastening screws 21 can be sequentially inserted into the insertion cavities 20, then be slipped through bores 22, which are located tightly against the outer periphery of flange 14, and next be screwed into the threaded bores 110 of junction 10 and finally be tightened. Standardized fastening screws or bolts may be used to acheive hard, bending-resistant rod connections by means of conventional screwdriver tools.

A modified connecting part 12a, which can be advantageously and economically be formed, is shown in FIG. 4. The connecting part 12a is formed as needed from a thick-walled tube, so as to shape an annular flange 14a at one end, which is provided with bores 22a to seat fastening screws 21. In this case, the connecting part 12a is connected to the tubular rod 11 by an annular weld 11a. The insertion cavity 20a for fastening screws 21 consists of a cylindrically shaped hollow portion. Alternatively, four millings (not shown) may also be provided, which are restricted to the space which is strictly determined by the size of the fastening screws alone.

The sizes of the outer and inner diameters $D_{a2}$ and $D_{i2}$ are significant in order that the (area) moment of inertia at this weakest location of connecting part 12a be at least as large as that of tubular rod 11 with outer and inner diameters $D_{a1}$ and $D_{i1}$, respectively. The diameter $D_{a3}$ of flange 14a and that of the connecting part 12a correspond to the outer diameter $D_{a1}$ of tubular rod 11. Furthermore, the spacing "e" between the axes of fastening screws 21 and the neutral axis of the connecting part, i.e., the longitudinal rod axis, should be as large as possible in order to keep the fastening screws as small as possible and capable of absorbing the bending moments that occur and ensure the required compression of the flange against the junction.

As regards the embodiment shown in FIG. 5, the connecting part 12b is formed by forging from the end of tubular rod 11. This connecting part 12b also is provided with four cross-like longitudinal ribs 19 as in the embodiment of FIGS. 2 and 3, which bound between themselves insertion cavities 20b for fastening screws (not shown). A flange 14b is welded to the outer end face of connecting part 12b and comprises four bores 22b to seat the fastening screws tightly against its outer periphery. The outer diameter of the connecting part and that of the flange in this case also correspond to that of the tubular rod 11. Furthermore, flange 14b can be provided with an annular connecting surface and a conical recess to house a centering boss at the junction similarly to the embodiment of FIGS. 2 and 3, if desired. $S_o$ denotes the ordinary wall thickness of tubular rod 11.

As regards the embodiments of FIGS. 2, 3 and 5, the connecting part 12 or 12b preferably is so shaped by hot-forming that its cross-section at its thinnest location has at least the same moment of inertia (area) as tubular rod 11.

The embodiment of the invention shown in FIGS. 6-8 is characterized in that a connecting part 12c is mounted between the disk-like flange 14c and tubular rod 11 in the manner of a cold or hot-formed tubular segment with a thicker wall. This connecting part 12c is connected on one hand by welding seams 11c and 11d to flange 14c and, on the other hand, to tubular rod 11. In the embodiment shown, connecting part 12c is provided with four impressed groove-like insertion cavities 20c for the fastening screws 21, the cavities being so shaped that these fastening screws are introduced from the side, slipped through bores 22c into and through the flange and turned and tightened into the threaded bores of the junction. The wall thicknesses $S_1$ and $S_2$ of connecting part 12c are such that the (area) moment of inertia everywhere is at least equal to that of tubular rod 11 with wall thickness $S_o$. This solution offers the advantage in manufacturing that the formed connecting parts 12c can be made from stiff-walled tubing, using the simplest means, to assume the shape of a tube spacer or adapter and that they can be welded to their flanges using largely mechanized welding systems. The assemblies consisting of a connecting part and a flange then can be connected by annular welds 11c to the tubular rod 11 using efficient equipment and thereby achieving economy.

What is claimed is:

1. A flange-screw connection between a rod and a junction means comprising corresponding support surfaces, characterized in that a flange (14) is secured to a connecting part (12) provided at the end of the rod which is of such cross-section as to have the same (area) moment of inertia as the rod (11), the flange comprising bores (22) adapted to receive fastening screws (21) therethrough, said bores being disposed close to the outer periphery of said flange and each terminating in an insertion-cavity (20) for receiving the fastening screws.

2. The flange-screw connection of claim 1, characterized in that the connecting part (12, 12b) is provided with longitudinal ribs (19, 19b) between which extend the insertion-cavities (20, 20b).

3. The flange-screw connection of claim 1, characterized in that the outer diameter of the connecting part (12) including flange (14) corresponds to that of rod (11).

4. The flange-screw connection of claim 1, characterized in that the connecting part (12b) is integrally formed with the rod end, and in that flange (14b) is welded to said connecting part.

5. The flange-screw connection of claim 1, characterized in that the connecting part (12, 12a, 12c) is welded to the rod end.

6. The flange-screw connection of claim 5, characterized in that the flange (14, 14a) is provided with an annular connecting surface (15, 15a), and in that the junction (10) is provided with a correspondingly fitted annular support surface (16) to seat the connecting surface (15, 15a) of flange (14, 14a).

7. The flange-screw connection of claim 6, characterized in that a recess (17, 17a) is provided inside the annular connecting surface (15, 15a) of flange (14, 14a), and in that a centering boss (18) is provided on junction (10) and is adapted to be seated in said recess (17, 17a).

* * * * *